(12) United States Patent
Lohr

(10) Patent No.: US 6,825,737 B2
(45) Date of Patent: Nov. 30, 2004

(54) DEVICE FOR BROADBAND ELECTRICAL SIGNAL TRANSMISSION USING A BI-DIRECTIONAL TRANSMISSION SYSTEM

(75) Inventor: Georg Lohr, Eichenau (DE)

(73) Assignee: Schleifring und Apparatebau GmbH (DE)

( * ) Notice: Subject to any disclaimer, the term of this patent is extended or adjusted under 35 U.S.C. 154(b) by 0 days.

(21) Appl. No.: 10/287,158

(22) Filed: Nov. 4, 2002

(65) Prior Publication Data

US 2003/0132812 A1 Jul. 17, 2003

Related U.S. Application Data (63) Continuation of application No. PCT/DE01/01708, filed on May 7, 2001.

(30) Foreign Application Priority Data

May 5, 2000 (DE) .......................................... 100 21 671

(51) Int. Cl.$^7$ ................................ H01P 5/00; H01P 5/18
(52) U.S. Cl. ...................... 333/24 R; 333/109; 333/111
(58) Field of Search ................................. 333/24 R, 109, 333/24 C, 32, 111; 329/332, 327, 348; 332/129, 135

(56) References Cited

U.S. PATENT DOCUMENTS 4,054,850 A * 10/1977 Gerrish ..................... 333/24 R

* cited by examiner

*Primary Examiner*—Robert Pascal
*Assistant Examiner*—Dean Takaoka
(74) *Attorney, Agent, or Firm*—St. Onge Steward Johnston & Reens LLC (57) ABSTRACT

An arrangement for broadband signal or energy transmission between at least two units mobile relative to each other along an optional trajectory, comprising a first unit with a symmetric open conductor structure consisting of a plurality of dummy elements that are terminated in a reflection-free manner on both ends, as well as at least one second unit that includes a coupling unit for coupling or decoupling electrical signals. At least one of said second units disposed for movement relative to the first unit is provided with a driver stage for coupling signals into the conductor structure of the first unit.

12 Claims, 5 Drawing Sheets

DEVICE FOR BROADBAND ELECTRICAL SIGNAL TRANSMISSION USING A BI-DIRECTIONAL TRANSMISSION SYSTEM

This application is a continuation of pending International Patent Application No. PCT/DE01/01708 filed May 7, 2001, which designates the United States and claims priority of pending German Application No. 10021671 filed May 5, 2000.

FIELD OF THE INVENTION

The present invention relates to a device or arrangement for transmitting electrical signals or energy, respectively, between several units mobile relative to each other.

For the sake of a clear description, the present patent document does not discriminate between the transmission of units mobile relative to each other and a stationary unit with units mobile relative to it because this is only a question of local reference and does not take any influence on the mode of operation of the invention. Moreover, a more detailed distinction between the transmission of signals and energy is not made as the mechanisms of operation are the same in this respect. Furthermore, the term "path of a movement" may correspond to a straight line, a circle or any other curve.

BACKGROUND OF INVENTION

With units mobile along a linear path, such as hoisting and conveying installations and also in the case of rotatable units such as radar installations or even computer tomographs, it is necessary to transmit electrical signals or energy between units mobile relative to each other. For the transmission of signals both contacting and non-contacting methods are known. U.S. Pat. No. 5,208,581 discloses a method that permits the transmission of signals in a contacting manner, using a closed conductor. This method displays two decisive disadvantages. On the one hand, it is applicable only for closed arrangements in rotational symmetry and does hence not provide a solution for linear transmission systems such as those required for crane installations. On the other hand, this system displays very poor high-frequency properties in the event of signal feed from a mobile unit into the signal paths. The problem here resides in the aspect that a termination must be coupled at a position diametrically opposite to the feeding site via a second sliding-contact arrangement. The signal transmission operates perfectly only when both the feed coupler and the termination are appropriately coupled. In practical operation, this can be achieved with very great difficulties only when the usual sliding-contact arrangements such as gold spring wire or silver graphite carbons are used. The reason for this resides in the aspect that such contact systems have a contact resistance that may have a broadband noise character over a bandwidth of up to several megahertz. When now a series circuit (feeding site and termination) of two of such contact systems is required for a perfect function of the transmission system a low-noise transmission can be realized only with a very high expenditure. In this respect, non-contacting transmission techniques entail advantages, such as those described in the U.S. Pat. No. 5,530,422 and in the German patent specification DE 197 00 110. The first one of these transmission techniques uses a strip line for transmission whilst the second one of these transmission techniques operates on a conductor structure composed of a plurality of discrete dummy elements. This offers the advantages of very high noise suppression. In distinction from the conductor system mentioned first, both conductor systems are connected by their ends to form a closed ring. They are open and may hence be matched with any trajectory whatsoever. A respective termination element is provided on both ends of these conductor structures to form a reflection-free termination. The signals are fed invariably at a suitable site into the conductor structure. Hence, the signals are always transmitted from the conductor structure to a unit disposed for movement relative to the conductor structure. This systems presents, however, serious disadvantages in various applications. When, for instance, in the case of a linear transmission the signal transmission from mobile crane installations to a stationary unit is desired, an antenna element must be mounted on that mobile crane installation, which element covers the entire length of the displacement path. This means that an antenna carrier of 50 m in length, for example, must be mounted at the bottom of the crane installation. In other fields of application, e.g. in computer tomographs, the conductor structure is applied on a mechanical slip ring that rotates together with the rotating part. Hence, data transmission from the rotating part to the stationary part is possible without any problems whilst a transmission in the opposite direction requires an additional ring for receiving a stationary conductor structure. Specifically in the field of computer tomographs, this cannot be realized for reasons of costs.

BRIEF DESCRIPTIONS OF THE INVENTION

The present invention is based on the problem of providing a device for the non-contacting transmission of electrical signals, which permits a transmission from a mobile unit to a conductor structure simultaneously in both directions.

For the signal transmission between two parts mobile relative to each other and disposed along any trajectory whatsoever, a symmetrical conductor structure is used which is operated on a differential signal and which is terminated in a reflection-free manner on both ends. In the event of a unidirectional transmission, the signals are fed into the conductor structure through a coupling unit disposed for mobility relative to it. This coupling unit is designed as a conductor structure that is so designed that it can couple signals into the first conductor structure by inductive or capacitive means. The signals are decoupled through a decoupling element mounted in a stationary manner relative to the conductor structure.

A particularly expedient embodiment of the arrangement is so designed that signals may be transmitted in both directions. The signal transmission direction from the conductor structure to an element mobile relative to the structure will be referred to as first transmission direction whilst the opposite direction will be referred to as the second transmission direction. The signal transmission in the first direction takes place on principle by feeding the transmission signal at an invariably predetermined site into the conductor structure. In the event of rotatable arrangements it is sensible to dispose the feeding site in the centre of the conductor structure, i.e. at the site that is equidistant from both ends. Hence, the delay times of the signal running to both ends of the conductor structure are of the same length and correspondingly the phase shift is zero. This results in a continuous phase development without discontinuities in the passage over the ends of the conductors. The signal transmission in the second direction takes place in the aforedescribed manner from the mobile unit to the conductor structure.

In a particularly simple embodiment of the arrangement, the receiver of the second direction can be mounted on the conductor structure on the same coupling site as the transmitter for the first direction. As a matter of fact, with this type of configuration, however, only a half-duplex operation is possible, which means that data can be transmitted in one of the two directions only by the same point of time.

Another expedient embodiment of the invention consists in the provision that directional couplers are used to separate signals of a first and a second data transmission means from each other. As a result, the simultaneous transmission is possible in both directions (full duplex operation).

In a further expedient embodiment of the invention, at least one of the two signals is modulated additionally onto a carrier for the first or the second direction. When this carrier is selected beyond the transmission range of the respectively other signal a simple separation of the two signals is also possible in duplex operation.

According to another embodiment of the arrangement, at least one directional coupler is integrated into the substrate of the conductor structure for decoupling the signals in a directionally selective manner.

A further embodiment of the invention provides for at least one directional coupler for directionally decoupling of the signals, which is integrated into the carrier of the conductor structure.

In a further embodiment of the invention, at least one directional coupler for directional separation of the signals is integrated into the feeder line leading to the coupling point of the conductor structure.

In another embodiment of the invention, the signals are coupled into and decoupled out from the conductor structure by units mobile relative to the structure. Hence, signal transmission is possible between units moving at different relative speeds.

Another embodiment provides for an additional invariable coupling and decoupling of signals on the conductor structure.

According to a further expedient embodiment of the invention, at least one coupler unit mobile relative to the conductor structure is realised as directional coupler. Hence, signals can be coupled in and decoupled out as a function of the direction. This permits a better separation of transmitted and received signals.

In another expedient embodiment of the invention, a respective receiver is undetachably connected on both ends of the conductor structure. Additionally, at least two mobile transmitter units are provided which are designed as directional couplers. These transmitter units are so disposed that the first transmitter unit transmits the signals in a direction towards the first receiver associated with it. The second transmitter unit is so arranged that it will transmit its signals in the opposite direction towards the receiver associated with it.

In a further advantageous embodiment of the invention, a transmitter for the first signal transmission direction as well as a receiver for the second signal transmission direction are coupled on at least one end of the conductor structure by means of a directional coupler. This directional coupler may be designed to comprise conducting elements or even discrete components such as transducers in correspondence with prior art. A receiver element designed as directional coupler is provided for receiving the signals from the first transmission direction. The transmitted signals are transmitted or coupled into the second transmission direction via a second coupler unit mobile relative to the conductor structure. In order to avoid over-coupling of the signals from the mobile transmitter to the mobile receiver it is necessary that the transmitter is located on that side of the receiver, which is turned away from the transmitter associated with the first signal transmission direction.

In another expedient embodiment of the invention at least one transmitter or receiver is coupled fixedly to the conductor structure via directional couplers and a mobile transmitter is provided, which is provided with a coupling element designed as directional coupler. The mobile receiver unit may be designed here without any directional selection when it is located on that side of the mobile transmitter, which is turned away from that end of the conductor structure, which is connected to the receiver of the second signal transmission direction.

In a further expedient embodiment of the invention, the mobile coupling elements for the mobile transmitter and for the mobile receiver are designed as directional couplers in the case of a fixed contact with the conductor structure with a transmitter and a receiver via directional couplers.

BRIEF DESCRIPTION OF THE DRAWINGS

In the following, the invention will be described, in an exemplary manner without any restriction of the general inventive idea, by the example of embodiments, referring to the drawing to which explicit reference is made in all other respects as far as the disclosure of all inventive particulars is concerned which are not explained in more details in the text. In the drawing.

DETAILED DESCRIPTION OF THE DRAWINGS

Figure 1:
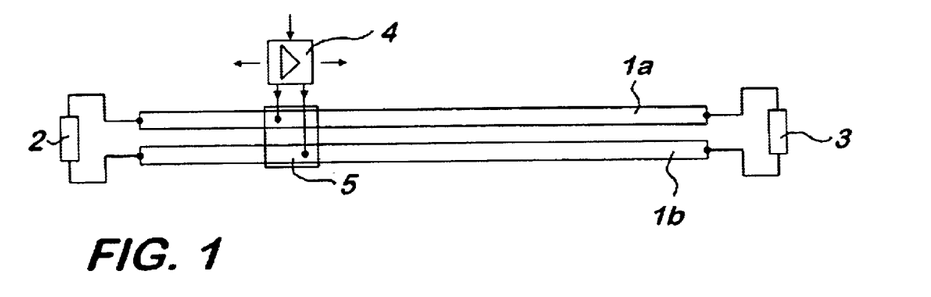
FIG. 1 illustrates a transmission arrangement with a mobile coupling unit.

FIG. 1 illustrated a general arrangement of a device for signal transmission.

A conductor structure consisting of the two symmetrically disposed conductors (1a) and (1b) is terminated on both ends with the terminations (2) and (3) in a reflection-free manner. A symmetrical signal generated by the driver stage (4) is coupled into this structure via the coupling element (5). This coupling element may be designed as a mechanical sliding contact or even as a non-contacting arrangement for inductive or capacitive coupling.

Figure 2:
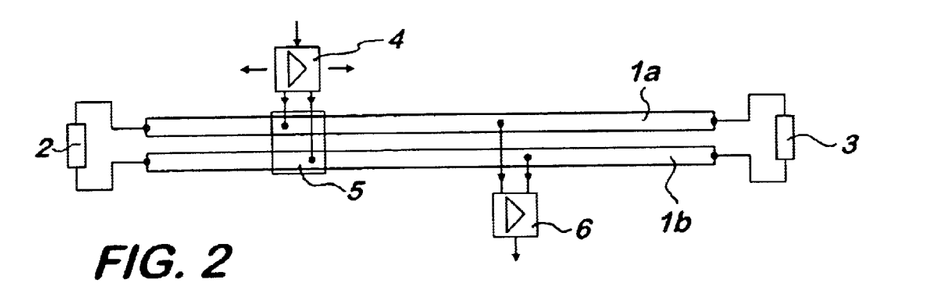
FIG. 2 shows an arrangement with an additional fixed decoupling unit.

FIG. 2 illustrates an arrangement, which comprises a first receiver element (6). Here, the fed signals are received via the receiver element (6) that is fixedly contacted with the conductor structure.

Figure 3:
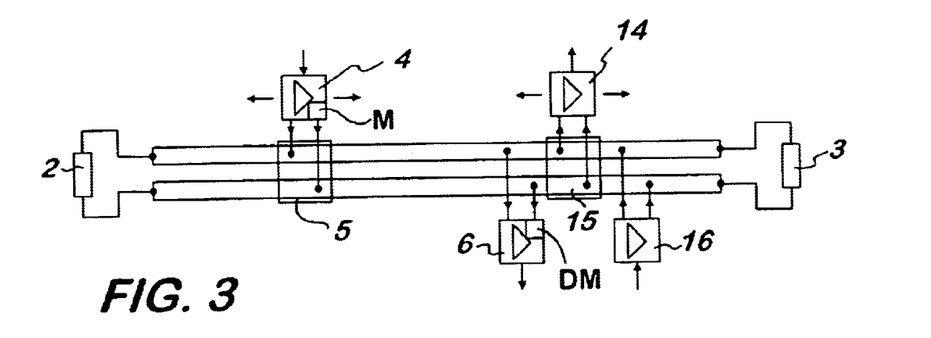
FIG. 3 is a view of an arrangement according to the invention with different units for coupling and decoupling.

FIG. 3 is the illustration of a particularly flexible embodiment of the invention. Here, a further receiver element (14) with an associated coupling element (15) is provided in addition to the aforedescribed components, which can be moved optionally together with or independently of the first driver stage (4) relative to the conductor structure. Hence, a communication between both moved units is possible. Moreover, any number whatsoever of these mobile units may be provided. The first driver stage (4) and the first receiver stage (6) are provided with a modulator (M) and a demodulator (DM), respectively.

Furthermore, a second driver stage (16) is provided that is fixedly connected to the conductor structure.

The arrangement shown here is fundamentally suitable for functional operation even without the two fixedly installed units (6) and (16).

Figure 4:
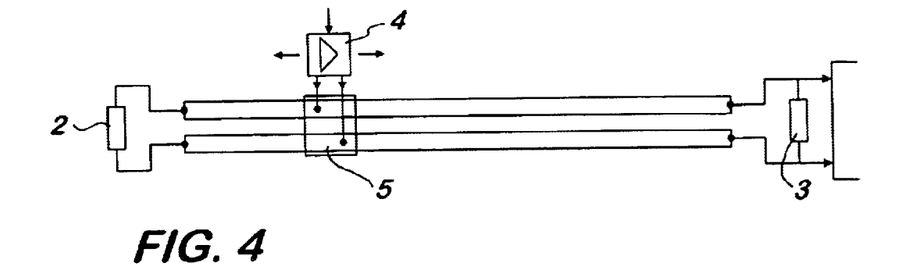
FIG. 4 illustrates an arrangement with a fixedly connected decoupling unit.

FIG. 4 is an exemplary illustration of an arrangement including a receiving unit (17) fixedly connected to the conductor structure, with its input impedance cooperating with the terminating impedance (3) to ensure a reflection-free termination of the conductor structure.

Figure 5:
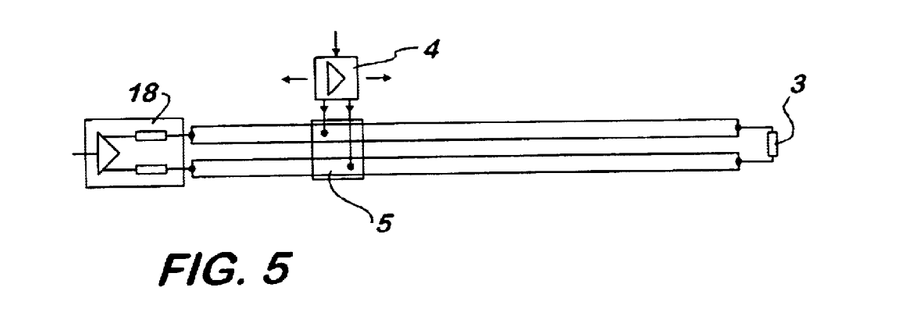
FIG. 5 shows an arrangement including a fixedly connected coupling unit.

FIG. 5 shows an exemplary view of an arrangement comprising a transmitter unit (18) fixedly connected to the conductor structure, with its output impedance ensuring a reflection-free termination of the conductor structure. It is expedient on principle to terminate also that end of the conductor structure in a reflection-free manner, which is used for stationary coupling. There are, however, also applications where a reflection may be tolerated on this end. In such cases a low-resistance feed is advantageous on account of the higher signal amplitude that can be achieved with this design.

Figure 6:
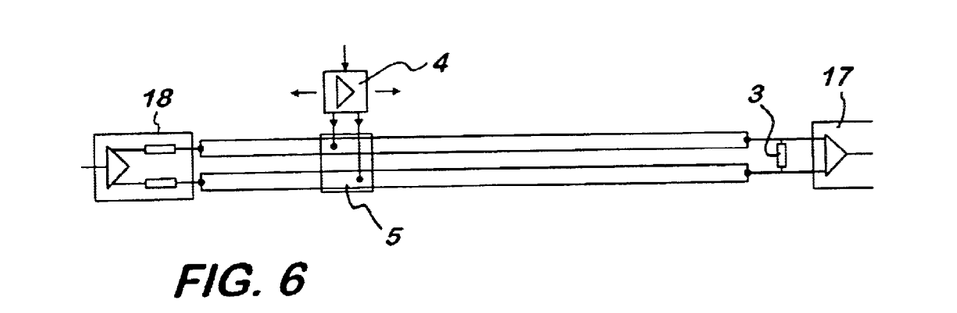
FIG. 6 shows an arrangement with a fixedly connected unit for coupling and decoupling.

FIG. 6 is an exemplary view of an arrangement comprising a receiving unit (17) fixedly connected to the conductor structure and a transmitter unit (18) fixedly connected to the conductor structure.

Figure 7:
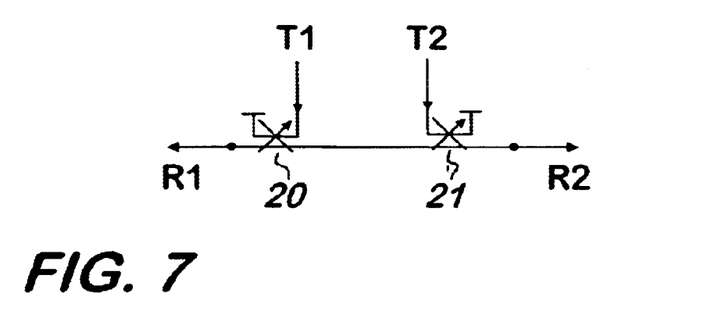
FIG. 7 illustrates an arrangement according to the invention for the simultaneous transmission of two signals from the mobile unit to the stationary unit.

FIG. 7 is a view illustrating the simultaneous transmission of two channels. Here, a receiving means is disposed on each end of the conductor structure. The signals are coupled from the mobile units into the structure via coupling elements designed as directional couplers (20), (21). The coupling direction of both directional couplers (20), (21) is oriented in opposite directions towards the respective associated receivers. The transmitter for the first transmission direction is identified as T1 whilst the reference numeral R1 denotes the associated receiver. The elements of the second transmission direction are identified as T2 and R2.

For the sake of simplicity the symmetrically designed conductor structures (1) are illustrated as plain lines in this view and in the following figures. They are realised as symmetrical components for those cases where the coupling elements for signal coupling and decoupling are designed as directional couplers. When directional couplers are coupled via lines to the conductor structure or coupling elements they may be optionally designed in a symmetrical or non-symmetrical form. A non-symmetrical structure is sensible when the directional coupler is coupled via a symmetrization element such as a balanced/unbalanced transformer to the symmetrically structured conductor structure.

Figure 8:
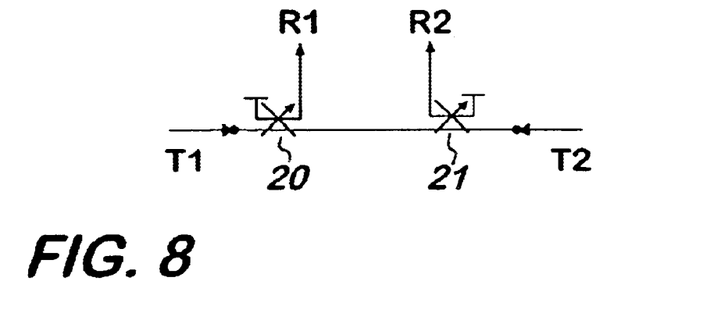
FIG. 8 is the view of an arrangement according to the invention for the simultaneous transmission of two signals from the stationary unit to the mobile units.

FIG. 8 illustrates a similar arrangement with the inverted data transmission means. Here, transmitters (T1), (T2) are disposed on both ends of the conductor structure. The associated receivers (R1), (R2) are disposed for movement via coupling elements designed as directional couplers (20), (21). Here, the coupling directions of the two directional couplers are opposite so that each receiver will exclusively receive the signals from the transmitter associated with it.

Figure 9:
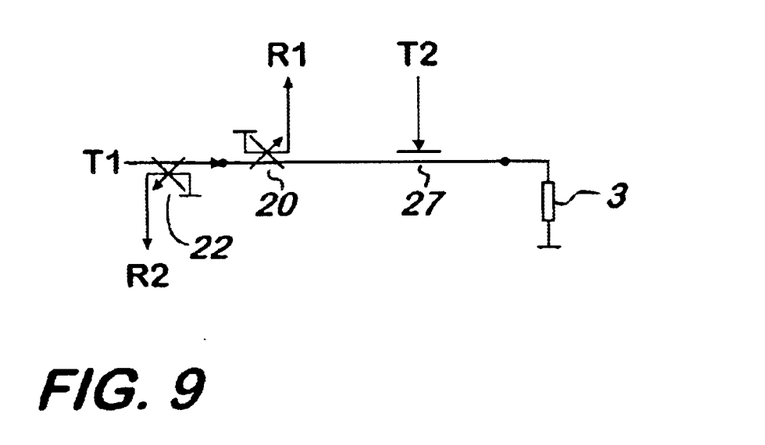
FIG. 9 shows an arrangement according to the invention for the directionally selective signal decoupling and the directionally selective signal coupling of the mobile unit.

FIG. 9 illustrates an arrangement in which a transmitter (T1) as well as a receiver (R2) are coupled via directional couplers on one end of the conductor structure. In this embodiment, the transmitter (T1) for the first transmission direction feeds the signal into the conductor structure whereas the directional coupler (22) selectively passes the signal arriving from the conductor structure to the receiver (R2) of the second transmission direction. A directional coupler (20) is provided as decoupling element for the first transmission direction, which transmits the signals selectively from the direction of the associated transmitter (T1) to the receiver (R2). A transmitter (T2) is provided on a second mobile unit that may be fixedly connected to the first mobile unit, which transmitter transmits its signals by means of a directionally selective coupling element (27) into the conductor structure. The signal of this transmitter now propagates in both directions in the conductor structure. In this step it is supplied, on the one hand, via the directional coupler connected to the conductor structure to the receiver (R2) of the second signal direction, and on the other hand, the second wave propagating in the opposite direction is absorbed by the reflection-free termination (3) of the conductor structure.

Figure 10:
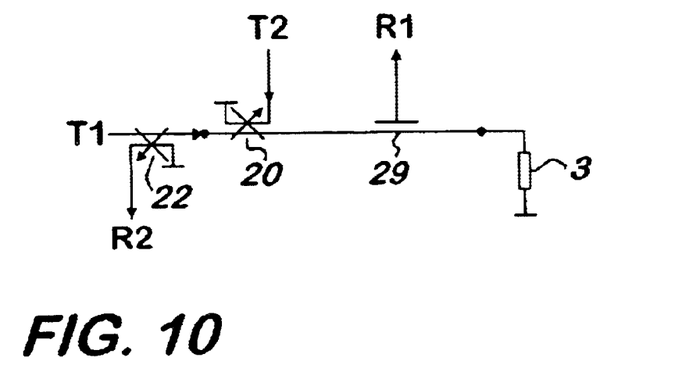
FIG. 10 is a view of an arrangement according to the invention for the directionally selective signal decoupling from and for the directionally selective signal coupling of the mobile unit.

FIG. 10 illustrates an arrangement where, compared against the previously described arrangement, the directionally selective elements are exchanged. Here, the transmitter (T2) of the second transmission direction is now coupled via a directional coupler (20) to the conductor structure. The mobile receiver is coupled to the conductor structure via a directionally selective coupling element. In this arrangement, a directional selectivity in the mobile receiver is not required because the signal of the mobile transmitter (T2) is exclusively transmitted in the direction towards the receiver (R1) that is fixedly connected to the conductor structure.

Figure 11:
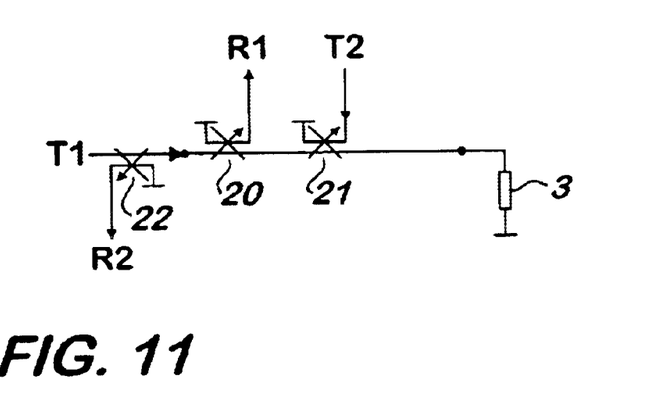
FIG. 11 shows the arrangement according to the invention for directionally selective signal coupling and directionally selective decoupling of signals of the mobile unit.

FIG. 11 illustrates a further arrangement where directional couplers are employed for signal coupling and decoupling of the mobile units. Compared against the two previously described arrangements, this arrangement presents the advantage that decoupling between the mobile transmitter and the mobile receiver is substantially higher.

Figure 12:
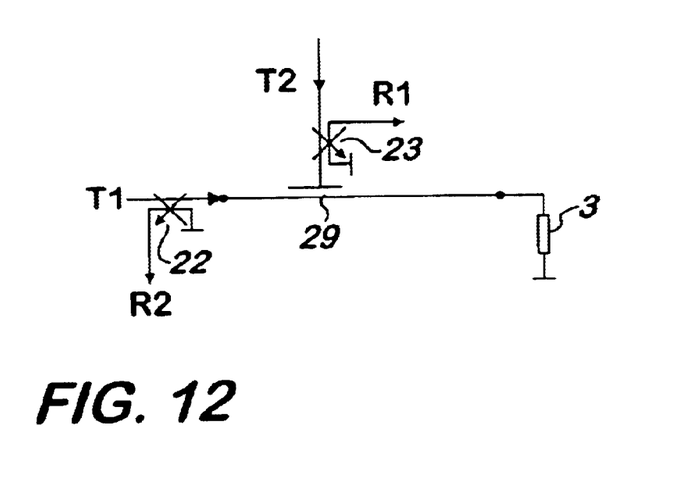
FIG. 12 illustrates an arrangement according to the invention for directionally selective signal coupling and decoupling of the mobile unit.

FIG. 12 is a view of an arrangement where the transmitter (T1) for the first transmission direction as well as the receiver (R2) for the second transmission direction are fixedly connected to the conductor structure by means of a directional coupler (22). Moreover, a mobile combined transmitter and receiver unit is provided in which the signals from the transmitter (T2) and the receiver (R1) are equally separated via directional couplers (23). A directionally non-selective coupling element (29) is used for signal coupling and decoupling.

Figure 13:
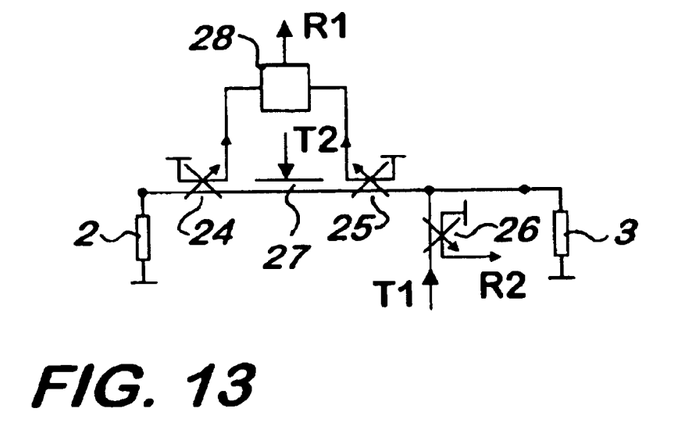
FIG. 13 is a view of an arrangement according to the invention optimised for a closed path.

FIG. 13 illustrates an arrangement of the type preferably employed for rotational transmission or at least with closed trajectories. Here, the transmitter for the first signal transmission direction (T1) as well as the receiver (R2) for the second signal transmission direction are coupled, for instance, by means of a directional coupler (26) approximately in the middle of the conductor structure. On principle, coupling may be carried out at any point whatsoever in the conductor structure. When the two ends of the conductor structure are, however, disposed close to each other the signal phases of the signals should be equal, if possible, at the ends. This can be achieved by the equal signal delay time of both signals and hence with equal conductor lengths. The unit mobile relative to this conductor structure is so designed that it can transmit or receive data from any position of the conductor structure. The transmission of the data (T2) from the mobile unit is carried out with the directionally selective coupling element (27). The signals are received (R1) as a function of the position of the fixed coupling unit relative to the mobile coupling unit, optionally via one of the two directional couplers (24) or (25). In the illustrated case, for example, the signal (T1) is coupled into the conductor structure and decoupled via the directional coupler (25) to the receiver (R1). The directional coupler (24) can here decouple only a negligible signal fraction on account of the wrong direction. The two directional couplers are combined in the combining unit (28) optionally via an adder or also via a changeover switch that may be controlled, for instance, by a position encoder.

Figure 14:
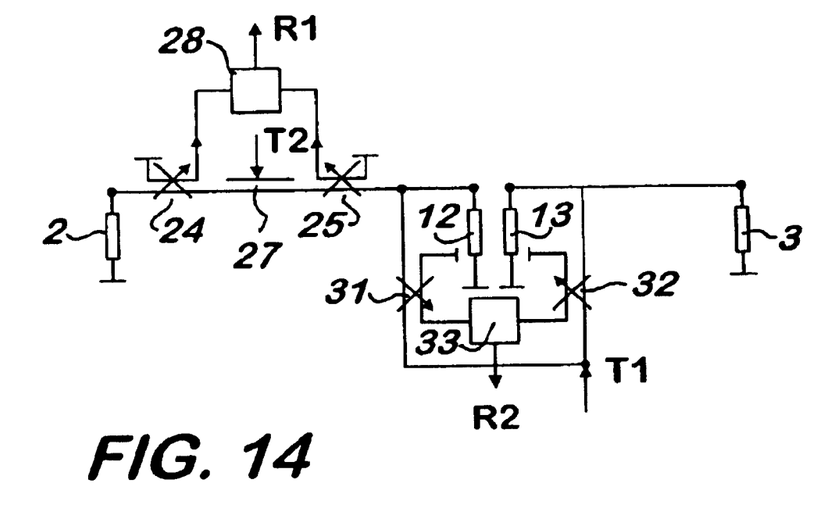
FIG. 14 illustrates a further arrangement according to the invention optimised for a closed path.

FIG. 14 shows an enhanced design of the arrangement shown in FIG. 13. When in the arrangement of FIG. 13 the coupling element (27) is located directly above the stationary coupling site of the transmitted signal (T1) or the received signal (R2), respectively, reception is not possible because the transmitted signal propagates via the conductor structure in the directions of the maximum coupling attenuation along the directional couplers (24) and (25). As a result, only a very small signal fraction can be decoupled. The arrangement illustrated in FIG. 14 provides a remedy in this respect. Here, the conductor structure is subdivided into two parts. Like the entire conductor structure described above, both parts are terminated in a reflection-free manner by the terminating impedance elements (2), (12) or (3), (13), respectively, on both ends. The stationary feeding sites are close to each other and spaced by a distance that is, however, at least as wide as one of the two directional couplers (24) or (25) used for mobile signal decoupling, plus the length of the coupling element (27). With this provision, it is ensured that at least one of the two directional couplers (24) or (25) receives a signal of the direction (T1) in the signal direction of low attenuation. For signal decoupling at the stationary sites, the two signals decoupled by the directional couplers (31) or (32) are combined with each other via a unit (33). This unit (33) may be designed as adder or also comprise a switch that switches between the two signals from the directional coupler (31) or (32) as a function of the position or the signal intensity.

FIG. 15 shows a particularly simple embodiment of the invention. For the sake of clear illustration, only the coupling means of one of the mobile elements is shown here. The signals are coupled or decoupled via two coupling elements independent of each other and separated in space if possible. The signal of the second transmission means (T2) is decoupled via the first one of these two coupling elements (35) into the conductor structure. The received signal is decoupled via the second coupling element (36) and passed on to the analyser unit (34). This analyser unit has the function to separate the received signal, which contains a sum of the signals of the transmitter (T1) of the first transmission means as well as of the transmitter (T2) of the second transmission means, by the transmission directions. In the simplest case, this happens by the subtraction of a certain fraction of the transmitted signal (T2), which corresponds approximately to the signal attenuation between the two coupling elements and the conductor structure. The difference is the received signal for the first direction (R1).

What is claimed is:

1. A device for non-contacting broadband signal or energy transmission between a stationary unit and a first and a second mobile unit which are mobile relative to the stationary unit along a path of movement, in which the stationary unit comprises one symmetrical open conductor structure operating on a differential signal and having at least one end terminated in a reflection-free manner, in which an electromagnetic wave can propagate;

the first mobile unit comprises a first coupling unit for coupling signals between the first mobile unit and the open conductor structure; and the second mobile unit comprises a second coupling unit for coupling signals between the second mobile unit and the open conductor structure; wherein the first mobile unit is provided with a first driver stage for generating first signals, the first signals being coupled into the open conductor structure by the first coupling unit;

a first receiver of signals and a second driver stage for generating second signals are fixedly contacted to the open conductor structure;

the second mobile unit is provided with a second receiver of signals which are decoupled into the second mobile unit by the second coupling unit; and at least one of the driver stages is provided with a modulator of signals, and a least one of the receivers is provided with a corresponding demodulator of signals.

2. A device for non-contacting broadband signal or energy transmission between a stationary unit and a mobile unit which is mobile relative to the stationary unit along a path of movement, in which the stationary unit comprises one symmetrical open conductor structure operating on a differential signal and having at least one end terminated in a reflection-free manner, in which an electromagnetic wave can propagate; and the mobile unit comprises a coupling unit for coupling signals between the mobile unit and the open conductor structure;

wherein at least two directional couplers which couple out signals traveling in only one direction from bidirectional signals are disposed to separate first signals generated by a first transmitter of signals from second signals generated by a second transmitter of signals, to allow selective reception of the first signals and the second signals by a first receiver of signals and a second receiver of signals, respectively the stationary unit is provided with a first transmitter connected to a first end of the open conductor structure to generate first signals to travel towards a second end of the open conductor structure which is terminated in a reflection-free manner;

the coupling unit of the mobile unit is a non-directional coupler for coupling signals into and decoupling signals from the open conductor structure;

the mobile unit is provided with the second transmitter to generate second signals which are coupled into the open conductor structure by the non-directional coupler;

the mobile unit is provided with the first receiver and a first directional coupler which is disposed between the second transmitter and the non-directional coupler for decoupling first signals from the first transmitter into the first receiver; and the stationary unit is provided with the second receiver and a second directional coupler which is disposed between the first transmitter and the first end of the open conductor structure for decoupling second signals from the open conductor structure into the second receiver of signals.

3. A device for non-contacting signal transmission comprising:

at least one symmetrical open conductor structure with at least one end terminated to minimized signal reflection in said at least one symmetrical open conductor structure;

a stationary unit having,
  a first receiver coupled to the open conductor structure, for receiving a first signal;
  a second driver stage coupled to the open conductor structure, for generating a second signal;

a first mobile unit traveling along a path of movement relative to said stationary unit, said first mobile unit having,
  a first coupler for coupling signals between said first mobile unit and said open conductor structure;
  a first driver stage for generating the first signal, the first signal coupled into said open conductor structure by said first coupler;

a second mobile unit traveling along the path of movement relative to said stationary unit, said second mobile unit having,
  a second coupler for coupling signals between the second mobile unit and the open conductor structure; and
  a second receiver for receiving the second signal;
    wherein at least one of the driver stages is provided with a modulator, and a least one of the receivers is provided with a corresponding demodulator for simultaneous two-way signal transmission.

4. A device for non-contacting signal transmission comprising:

at least one symmetrical open conductor structure with at least one end terminated to minimized signal reflection in said at least one symmetrical open conductor structure;

a stationary unit having,
  a stationary unit driver stage for generating a first signal, said stationary unit driver stage coupled to said open conductor structure;
  a stationary unit receiver for receiving a second signal, said stationary unit receiver coupled to said open conductor structure, the second signal coupled out of said open conductor structure by a first directional coupler a mobile unit traveling along a path of movement relative to said stationary unit, said mobile unit having,
  a mobile unit receiver for receiving the first signal, said mobile unit receiver coupled to the open conductor structure, the first signal coupled out of said open conductor structure by a second directional coupler;

a mobile unit driver stage for generating the second signal, the second signal coupled into said open conductor structure by said mobile unit coupler;
    wherein said first and second directional couplers couple out signals traveling in only one direction from bidirectional signals for simultaneous two-way signal transmission.

5. A device for non-contacting broadband signal or energy transmission between a stationary unit and a first and a second mobile unit which are mobile relative to the stationary unit along a path of movement, in which the stationary unit comprises one symmetrical open conductor structure operating on a differential signal and having at least one end terminated in a reflection-free manner, in which an electromagnetic wave can propagate;

the first mobile unit comprises a first coupling unit for coupling signals between the first mobile unit and the open conductor structure; and the second mobile unit comprises a second coupling unit for coupling signals between the second mobile unit arid the open conductor structure;
  wherein at least two directional couplers which can couple out signals traveling in only one direction from bidirectional signals are disposed to separate first signals generated by a first transmitter of signals from second signals generated by a second transmitter of signals, to allow simultaneous two-way signal transmission of the first and second signals to a first and a second receiver of signals, respectively.

6. The device according to claim 5 wherein the first and the second mobile units are provided with the first and the second transmitter respectively;

the stationary unit is provided with the first and the second receiver connected to a first and a second end of the open conductor structure, respectively; and the first and the second coupling units are directional couplers disposed so that the first signals coupled into the open conductor structure from the first mobile unit and the second signals coupled into the open conductor structure from the second mobile unit travel in opposite directions along the open conductor structure to the first and the second receiver, respectively.

7. The device according to claim 5 wherein the first and the second mobile units are each provided with the first and the second receiver respectively;

the stationary unit is provided with the first and the second transmitter connected to a first and a second end of the open conductor structure, respectively; and the first and the second coupling units are directional couplers disposed so that first and second signals which travel in opposite directions from the first and the second transmitter are coupled into the first mobile unit and the second mobile unit, respectively.

8. The device according to claim 5 wherein the stationary unit is provided with the first transmitter connected to a first end of the open conductor structure to transmit first signals in a first direction to a second end which is terminated in a reflection-free manner;

the first mobile unit is provided with the first receiver, the first coupling unit being a first directional coupler disposed to decouple the first signals from the open conductor structure to the first receiver;

the second mobile unit is provided with the second transmitter and is disposed between the first mobile unit and the terminated second end of the open conductor structure, the second coupling unit being a non-directional coupler; and the stationary unit is provided with the second receiver and a second directional coupler disposed between the first transmitter and the first end of the open conductor structure for decoupling second signals received from the second transmitter in a second direction into the second receiver.

9. The device according to claim 5 wherein the stationary unit is provided with the first transmitter connected to a first end of the open conductor structure to transmit first signals in a first direction to a second end which is terminated in a reflection-free manner;

the first mobile unit is provided with the second transmitter, the first coupling unit being a first directional coupler disposed to couple second signals in a second direction into the open conductor structure;

the second mobile unit is provided with the first receiver of signals and is disposed between the first mobile unit and the terminated second end of the open conductor structure, the second coupling unit being a non-directional coupler; and the stationary unit is provided with the second receiver and a second directional coupler disposed between the first transmitter and the first end of the open conductor structure for decoupling second signals received from the second transmitter in a second direction into the second receiver.

10. The device according to claim 5 wherein the stationary unit is provided with the first transmitter connected to a first end of the open conductor structure to transmit first signals in a first direction to a second end which is terminated in a reflection-free manner;

the first mobile unit is provided with the first receiver of signals, the first coupling unit being a first directional coupler disposed to decouple first signals from the open conductor structure;

the second mobile unit is provided with the second transmitter of signals and is disposed between the first mobile unit and the terminated second end of the open conductor structure, the second coupling unit being a second directional coupler disposed to couple second signals into the open conductor structure in a second direction towards the first end of the open conductor structure; and the stationary unit is provided with the second receiver and a third directional coupler disposed between the first transmitter and the first end of the open conductor structure for decoupling second signals received from the second transmitter in the second direction into the second receiver.

11. The device according to claim 5 wherein the stationary unit is provided with the first transmitter which is connected to the open conductor structure at an optional fixed point along the open conductor structure, preferably in a middle thereof, the fixed point dividing the open conductor structure into a first part and a second part, each part having one end terminated in a reflection-free manner;

the first mobile unit is provided with the first receiver and two coupling units spaced from each other along the open conductor structure, and can receive signals from every point of the open conductor structure;

the two coupling units are a first and a second directional coupler and are disposed so that signals of the first transmitter which travel along any one part of the open conductor structure are coupled into the mobile unit by only one of the first and second directional couplers in dependence on a relative position of the fixed point to the mobile unit;

the first mobile unit is provided with a combining means comprising an adding circuit or a switching means controlled by a position encoder, for signals received from the first and second directional couplers;

the second mobile unit which is movable along the open conductor structure is provided with the second transmitter and is coupled thereto by a non-directional coupler; and the stationary unit is provided with the second receiver and a third directional coupler which is disposed between the first transmitter and the optional fixed point of the open conductor structure for decoupling signals of the second transmitter into the second receiver.

12. The device according to claim 5 wherein the open conductor structure is divided into a first part and a second part separated from each other, both ends of each part being terminated in a reflection-free manner;

the stationary unit is provided with the first transmitter which is connected to the first part of the open conductor structure at a first stationary point, and to the second part of the open conductor structure at a second stationary point, the two stationary points being at a close distance from each other;

the first mobile unit is provided with the first receiver and two coupling units spaced from each other along the open conductor structure, and can receive signals from every point of the open conductor structure;

the two coupling units are a first and a second directional coupler and are disposed so that signals of the first transmitter which travel in any one direction along any one part of the open conductor structure are coupled into the mobile unit by only one of the first and second directional couplers;

the second mobile unit which is movable along the open conductor structure is provided with the second transmitter and is coupled thereto by a non-directional coupler;

the close distance between the stationary points is at least as wide as a length of one of the first or second directional couplers plus a length of the non-directional coupler;

the first mobile unit is provided with a combining means comprising an adding circuit or a switching means controlled by a position encoder, for signals received from the first and second directional couplers; and the stationary unit is provided with a third and a fourth directional coupler disposed between the first transmitter and the first and second stationary point, respectively, for coupling in signals received from the first and second part of the open conductor structure, respectively, to the second receiver via a combining means comprising an adding circuit or means for switching between signals received from the first and second directional couplers as a function of position or signal intensity.

* * * * *